United States Patent [19]

Danby et al.

[11] Patent Number: 4,555,949

[45] Date of Patent: Dec. 3, 1985

[54] OPTICAL FLUID PRESSURE SENSOR

[75] Inventors: Hal C. Danby, Palo Alto; Carl Ritson, San Jose, both of Calif.

[73] Assignee: Anatros Corporation, San Jose, Calif.

[21] Appl. No.: 607,080

[22] Filed: May 4, 1984

[51] Int. Cl.[4] .............................................. G01L 7/00
[52] U.S. Cl. ................................... 73/705; 250/231 P
[58] Field of Search ................. 73/705, 747, 749, 293; 250/231 P

[56] References Cited

U.S. PATENT DOCUMENTS 2,521,784 9/1950 Garis ...................................... 73/705
3,209,596 10/1965 Kelly ...................................... 73/749

OTHER PUBLICATIONS

Teodorescu, "Linear Displacement Sensor Uses Liquid Crystal Cell", Electronic Engineering, vol. 47, No. 570, p. 9.

Primary Examiner—Donald O. Woodiel
Attorney, Agent, or Firm—William B. Walker

[57] ABSTRACT

An optical pressure sensor including a light source, a light detector and a capillary system positioned in the light path between the light source and detector. The capillary system inlet receives liquid from the external source to be monitored, and the outlet is closed or connects with a closed gas reservoir. Light absorbing liquid forced by liquid pressure into the capillary system absorbs a portion of light corresponding to the area occupied by the liquid. This reduces the output of the light detector in an amount functionally related to the liquid pressure.

10 Claims, 4 Drawing Figures

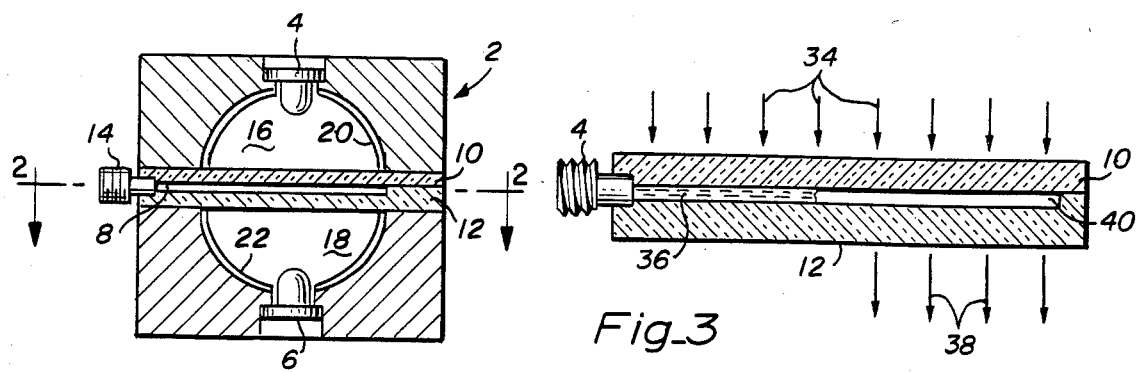
Fig_1  Fig_3
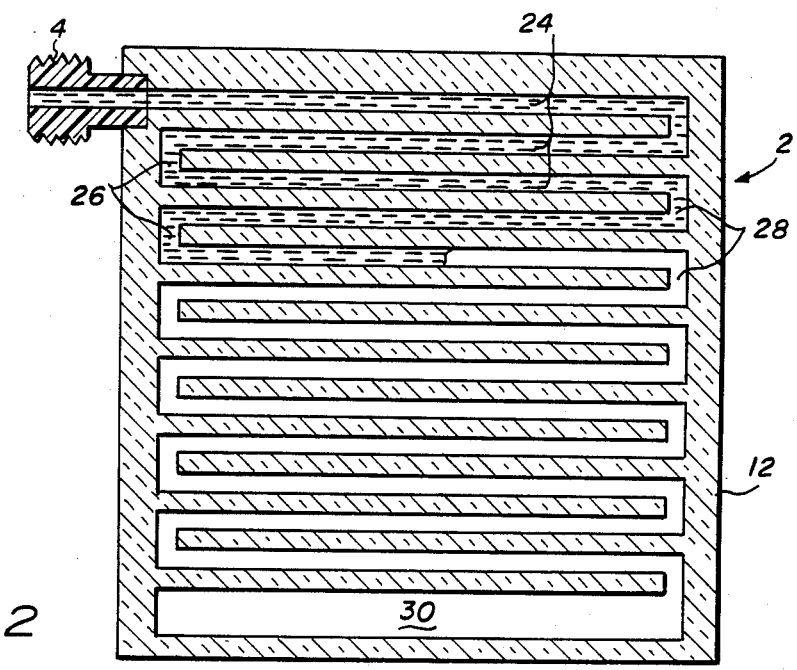
Fig_2
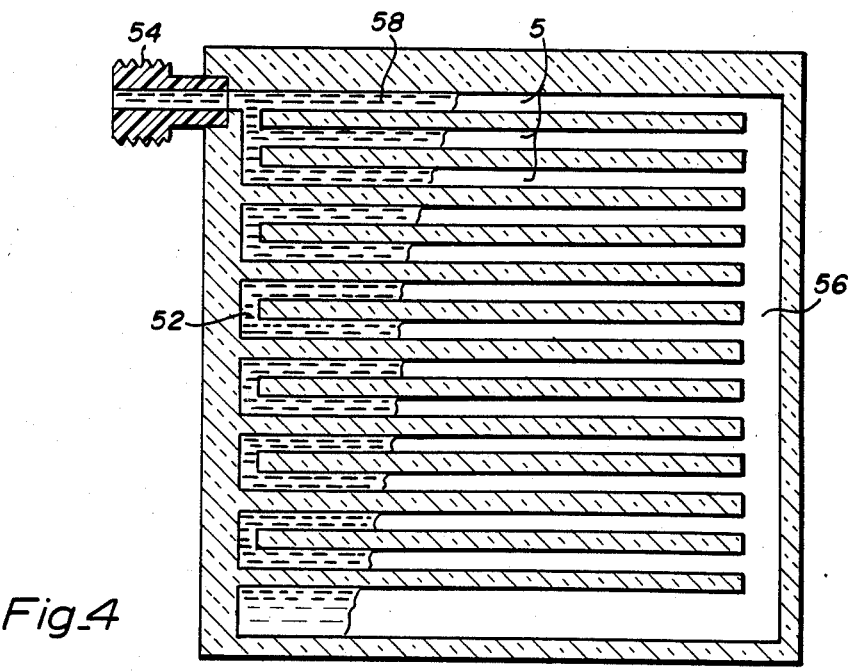
Fig_4

OPTICAL FLUID PRESSURE SENSOR

FIELD OF THE INVENTION

This invention relates to the measurement of fluid pressures. In particular, this invention relates to an apparatus for continuously measuring fluid pressure using an optical sensing system.

BACKGROUND OF THE INVENTION

Parenteral solution delivery is usually accomplished using fluid pressure provided by hanging the solution source above the patient. This practice has continued despite the development of newer fluid reservoir systems such as plastic bags and the development of precision pumping systems. Obstructions of the delivery system within the body are common due to clotting, body movement, vein collapse, infiltration (extravasation), catheter position (proximity of vessel wall to the end of the catheter), and the like. This increases fluid pressure in the system between the pump and the patient until the pressure frees the blockage or the motor stops unless the system has a safety system disengaging the pump motor from the pump or a safety valve releasing the pressure.

Sudden blow-out of the blockage poses a serious danger to the patient. To prevent this, it is necessary to sense any significant increase in fluid pressure between the pump and patient and to immediately stop the pumping action. The devices heretofore available do not have the required sensitivity, and the risk of patient injury from parenteral pump delivery systems continues.

DESCRIPTION OF THE PRIOR ART

Prior to this invention, limited methods have been available to measure fluid pressures. Manometer systems (U.S. Pat. No. 2,817,237) have been used in measuring pressure differentials across flow restrictors to determine fluid flow rates. Bellows with radiation sources (U.S. Pat. No. 3,977,391) have been used. An optical device for measuring pressure differences by means of a light intensity change is described in U.S. Pat. No. 4,322,978. In this system, pressure changes deflect a reflective surface, causing displacement of the light path of reflected light and consequential change in light intensity on a light detector. The device is not suitable for use with parenteral systems.

U.S. Pat. No. 4,398,542 discloses a fluid pressure monitoring system with a pressure diaphram operating on a pressure transducer. Increasing fluid pressure causes movement of the diaphram and increases pressure on the pressure transducer. Piston systems responding to increased fluid pressure to apply increased pressure on pressure transducers are also known. These systems lack the precision and sensitivity required for patient safety.

SUMMARY OF THE INVENTION

The optical pressure sensor of this invention is a system for measuring the pressure of light absorbing liquid. It comprises a light source, a light detector and a capillary positioned in the li9ht path from the light source to the light detector. The inlet end of the capillary is open for communication with liquid to be monitored for pressure, and the other end of the capillary is closed or communicates with a closed reservoir. With increased pressure of the liquid to be monitored, increasing amounts of the liquid pass into the capillary passageway and into the capillary area between the light source and light detector. This blocks or disrupts light flow to the light detector in proportion to the proportion of the capillary area occupied by the liquid, causing a corresponding decrease in electric signal from the light detector. Only very slight increases in liquid pressure cause substantial changes in obstructed capillary area with easily detected changes in the light detector output.

BRIEF DESCRIPTION OF THE DRAWINGS

FIG. 1 is a cross-sectional view of the optical pressure sensor device of this invention.

FIG. 2 is a cross-sectional view taken along the line 2—2 in FIG. 1 showing a serial capillary configuration.

FIG. 3 is a schematic representation of the capillary area of the pressure sensor device of this invention illustrating the operating principle thereof.

FIG. 4 is a cross-sectional view showing a parallel connected capillary configuration.

DETAILED DESCRIPTION OF THE INVENTION

FIG. 1 shows a cross-sectional view of the pressure sensor device of this invention. The fluid pressure monitor 2 has a light source or light emitter 4 which can be a conventional lamp or light emitting diode. Because the system can be entirely closed to light, the light frequency emitted by the lamp is not critical. Light which is maximally absorbed by the liquid to be monitored is preferred. Infra-red light is particularly suitable for most liquids. The light detector 6 is a light detecting diode which is sensitive to the frequency spectrum of light emitted by the emitter 4.

The capillary passageway 8 is positioned between upper transparent plate 10 and lower transparent plate 12, and can be formed in the surface of either. The opposing surfaces of the upper and lower plates 10 and 12 are in sealing engagement and can be permanently joined together in a unitary, integral construction, if desired. The capillary passageway 8 has an inlet end communicating with the inlet connector 14. The opposing end is closed or communicates with a closed gas reservoir as is shown in detail in FIG. 2.

The light emitter 4 communicates with the light emitter cavity 16 which has a reflective surface shaped to direct light toward the capillary area. The light detector communicates with the light detector cavity 18 on the opposite side of the capillary area. The surfaces of the cavities 16 and 18 are reflective and shaped to direct light emitting from the capillary area toward the light detector. The surfaces of the cavities 16 and 18 can have the cross-sectional shape of an arc of a circle and are preferably parabolic. Preferably, the reflective surfaces of the cavities 16 and 18 have highly reflective, metalized coatings 20 and 22, respectively.

FIG. 2 is a cross-sectional view of the optical pressure monitor of this invention taken along the line 2—2 of FIG. 1. In this view of the pressure monitor 2, the lower plate 12 has a plurality of linear passageways 24, the ends thereof being serially connected in a zig-zag configuration by serial connecting passageways 26 and 28. The inlet end of the passageway system communicates with the inlet opening connector 4. The other end of the passageway system communicates with the closed gas reservoir 30.

In operation with the connector 4 communicating with a liquid flow to be monitored for pressure increase, liquid passes into the capillary passageway 24 until the pressure of the gas in the remainder of the capillary system and the reservoir 30 rises sufficiently to balance the liquid pressure and stop the liquid advance. If the liquid pressure increases, liquid again advances into further portions of the capillary system until the gas pressure in the remainder of the system rises to balance the liquid pressure. If the liquid pressure decreases, the gas displaces the liquid from the passageway until the gas and liquid pressures are balanced.

The capillary passageways in this system can have any cross-sectional shape or configuration desired. They can have circular, elliptical, rectangular, triangular or other shapes as desired. The cross-sectional area of the capillary should be sufficiently small to prevent liquid from bypassing gas in the passageway, entrapping bubbles of gas in the liquid phase. The term "capillary" as used herein is defined to include all dimensions of passageways which meet the above specifications and is not limited to dimensions which provide capillary action. The preferred cross-sectional areas are less than 5 mm$^2$ and is preferably within the range of from 0.1 to 1.0 mm$^2$ for most aqueous solutions.

FIG. 3 is a schematic cross-sectional view of the capillary area of the device of this invention to illustrate the operating principles of the system. Light rays 34 impinge on the upper plate 10, and the portion absorbed by the liquid in capillary zone 36 do not reach the lower plate 12 and do not pass therethrough to a light detector. Light rays 38 which have passed through the passageway areas 40 which are not occupied with liquid, not being absorbed, pass through the lower plate 12 to a light detector (not shown). The output of the light detector 6 is a direct function of the amount of light 38 passing through the passageway area. The output level of the light detector 6 can be used to indicate the liquid pressure, provide an alarm signal when pressure increases, and/or shut off the pumping action of a parenteral solution delivery pump if the pressure exceeds a predetermined level using conventional control systems which are well known in the art.

FIG. 4 is a cross-sectional view of an alternate embodiment of this invention showing a parallel connected capillary passageway system. In this system, the capillary passageways 50 are arranged in parallel configuration, the inlet openings of each communicating with an inlet manifold or channel 52 which communicates with the inlet connector 54. The outlet openings of the passageways 50 communicate with the closed gas reservoir 56. Liquid 58 which has passed into the capillary area reduces the amount of light passing through the passageway zone as a direct function of the liquid pressure level. Liquid enters the passageways 50 until the gas pressure in the remainder of the passageways and reservoir 56 balances the liquid pressure in the same manner described above with respect to FIGS. 2 and 3.

The length of the capillary passageways and respective volume ratios of the passageways and the gas reservoir determine the sensitivity of the system. The capillary configuration in FIG. 2 provides greater sensitivity than the configuration in FIG. 4. Higher reservoir to capillary volume ratios also increase sensitivity, requiring the entrance of proportionally more liquid into the passageways before a liquid pressure increase is balanced.

Capillary passageways having a linear, parallel configuration shown in the illustrated embodiments of this invention are merely representative of the shapes of the passageways, and this invention is not limited thereto. The capillary passageways can be a continuous spiral, for example, or be concentric circular paths, connected either in series or in parallel, as desired, with the reservoir in the center or, alternatively, for example, in the outer perimeter.

The invention claimed is:

1. An optical fluid pressure sensor comprising a light source, a light detector positioned in the path of light from the light source, and a transparent capillary passageway means containing a gas and positioned in the light path from the light source to the light detector, the capillary passageway means having an inlet end means for receiving liquid from an external source under fluid pressure to be monitored and an outlet end, the outlet end thereof having a closure means for preventing escape of gas therefrom.

2. The optical pressure sensor of claim 1 wherein the light source is a light emitting diode and the light detector is a light detecting diode.

3. The optical pressure sensor of claim 1 wherein the capillary passageway means comprises a capillary passageway formed in the surface of a first transparent plate against which a second transparent plate is positioned in sealing engagement.

4. The optical pressure sensor of claim 1 wherein the capillary passageway means comprises a plurality of capillary passageways connected in a zig-zag configuration to form a capillary passageway zone.

5. The optical pressure sensor of claim 4 wherein the capillary passageways are linear and parallel, the ends thereof being serially connected.

6. The optical pressure sensor of claim 5 wherein the capillary passageways are formed in the surface of a first transparent plate against which a second transparent plate is positioned in sealing engagement.

7. The optical pressure sensor of claim 4 wherein the capillary passageways are linear and parallel, the inlet ends thereof communicating with and connected by an inlet means, the outlet ends of the capillary passageways being connected to a closed gas reservoir.

8. The optical pressure sensor of claim 7 wherein the capillary passageways are formed in the surface of a first transparent plate against which a second transparent plate is positioned in sealing engagement.

9. The optical pressure sensor of claim 4 including a light source cavity having a reflective surface and positioned for directing light from the light source toward the capillary passageway zone.

10. The optical pressure sensor of claim 4 including a light detector cavity having a reflective surface and positioned for directig light passing through the capillary passageway zone toward the light detector.

* * * * *